US008717143B2

(12) United States Patent
Zhu et al.

(10) Patent No.: US 8,717,143 B2
(45) Date of Patent: May 6, 2014

(54) SEARCHABLE BINDER

(75) Inventors: Shengbo Zhu, San Jose, CA (US); Su Shiong Huang, Bellevue, WA (US)

(73) Assignee: Silicon Valley Micro E Corp., San Jose, CA (US)

(*) Notice: Subject to any disclaimer, the term of this patent is extended or adjusted under 35 U.S.C. 154(b) by 862 days.

(21) Appl. No.: 12/925,049

(22) Filed: Oct. 13, 2010

(65) Prior Publication Data

US 2012/0093569 A1 Apr. 19, 2012

(51) Int. Cl.

| | |
|---|---|
| ***G08B 5/22*** | (2006.01) |
| ***A47B 65/00*** | (2006.01) |
| ***A47G 29/087*** | (2006.01) |
| ***A47F 5/08*** | (2006.01) |
| ***B42D 1/00*** | (2006.01) |
| ***G06F 19/00*** | (2011.01) |
| ***B42F 3/00*** | (2006.01) |
| ***G06F 7/00*** | (2006.01) |

(52) U.S. Cl.
USPC ........... 340/8.1; 402/3; 211/42; 211/119.003; 211/153; 281/15.1; 235/385; 700/214; 700/220

(58) Field of Classification Search
USPC ............. 340/8.1, 825.36, 825.49, 570; 402/3; 211/11, 42, 46, 48, 119.003, 151, 153; 281/15.1–44; 235/375–385; 700/214, 700/220
See application file for complete search history.

(56) References Cited

U.S. PATENT DOCUMENTS

| | | | | |
|---|---|---|---|---|
| 5,689,238 | A * | 11/1997 | Cannon et al. | 340/572.1 |
| 5,721,531 | A * | 2/1998 | Garver et al. | 340/8.1 |
| 5,977,875 | A * | 11/1999 | Lin et al. | 340/570 |
| 6,275,142 | B1 * | 8/2001 | Paleiov et al. | 340/10.1 |
| 7,772,980 | B2 * | 8/2010 | Bauchot et al. | 340/572.7 |
| 2002/0190871 | A1 * | 12/2002 | Stanfield et al. | 340/825.49 |
| 2005/0135873 | A1 * | 6/2005 | Yeh | 402/73 |
| 2009/0021927 | A1 * | 1/2009 | Hall et al. | 362/92 |

FOREIGN PATENT DOCUMENTS

GB 2419 722 A1 3/2006

* cited by examiner

*Primary Examiner* — Benjamin C Lee
*Assistant Examiner* — Adam Carlson

(57) ABSTRACT

A binder management system having a cabinet with shelves for removable storage of searchable binders. Each binder has a body with front and rear covers and a spine. Inside the body is a binder mechanism for removably retaining sheet media. Each binder has externally extending upper and tower ohmic contact members which ohmically engage conductive members mounted on the shelf surfaces near the front. Each binder has a binder identification circuit coupled to an LED mounted on the binder spine in a location visible when the binder rests on a shelf. When a binder identification signal from a host computer is presented to the shelf conductive members it is transferred by the binder contact members to the binder identification circuit. If the signal matches, the LED is activated to aid the user in finding the binder. An LED and an optional audible indicator are mounted on the shelves to further aid the user in finding the sought binder.

10 Claims, 11 Drawing Sheets

SEARCHABLE BINDER

BACKGROUND OF THE INVENTION

This invention relates to documents management in general, and in particular to an improved documents management technique using a set of searchable binders.

In medical records, legal and business offices, and some homes, notebook binders (hereinafter "binders") are typically used to store documents used for medical, legal, other business and personal purposes. A typical binder has a front cover, a rear cover and a spine joining the two covers. Inside the binder, a multi-ring manually operable binder mechanism having two or more two-piece arcuate rings is permanently mounted to facilitate insertion, storage and removal of documents having a number of holes formed along a mounting edge, with the number of holes corresponding to the number of rings of the binder mechanism. Each binder is typically removably supported on a shelf by placing the bottom edges of the binder covers and spine of a closed binder on the top surface of the supporting shelf. Several binders are typically installed on a given shelf, and several shelves are typically incorporated into a shelf support structure, such as a cabinet. In order to enable the documents contained in the various binders to be readily accessed, some type of documents management system is necessary.

Documents management is typically performed by binder management. Each document is initially assigned to, and placed in, an identified binder dedicated to documents of a particular subject matter (e.g., "utility bills for a specific account"). Later-generated related documents are typically assigned to and placed in this same binder. When a binder is filled to capacity by documents, a new binder is provided for receiving additional documents of the same category.

Binder management is typically conducted by providing each binder with a label in a location (usually somewhere on the spine of the binder) in which the label is visible when the binder is stored on a shelf. The label contains readable information describing the content of the binder. The readable information is typically a short form of identification, such as an account name, a subject name (e.g., "Bank Statements") or the like.

In order to provide ready access to the individual documents contained in the binders, some type of indexing arrangement is normally used to identify the location of each binder. A simple technique commonly employed is a manually prepared master list of all binders in the binder management system referencing each binder by the label information and noting the shelf and cabinet location of each binder. In large installations, more sophisticated indexing arrangements are used, such as a computer-based index listing all binders by a short form identifier and a corresponding enlarged and more thorough description of the binder contents. Even such computer-based arrangements still require the use of a readable label on each binder in order to identify a given binder to a user. This is highly undesirable, since it facilitates the search by any unauthorized user for a specific binder name or for a binder containing information of a particular type. Nevertheless, known binder management systems require the use of visible labels in order for the binders to be reasonably locatable.

In those applications in which several individuals have access to the binders, some arrangement is usually made to monitor the disposition of the binders. For example, in a business application, it is convenient and sometimes necessary to provide a sign out and return procedure so that the whereabouts of a given binder will always be known. Usually, such monitoring attempts fail to accurately track the binders because of the failure of individuals to faithfully follow the procedure. Consequently, at any given time, the integrity of the binder management system can only be verified by actually looking through each shelf and comparing the binders and their contents with the master index. This requirement is both time-consuming and burdensome, and thus a severe disadvantage.

In known binder management systems of the type described above, once a binder is provided with a contents identifier, that binder is permanently associated with the nature of its contents. To change the contents to some other category, the binder must either be thrown away and a new, unmarked binder substituted in its place, or the identification label must be changed. In addition, the master index must be up-dated, either manually or by using the computer in a computer-based indexing system. These procedures are not always followed by office personnel, and the integrity of the binder system is consequently compromised.

In all examples of known binder management systems, the binders are usually provided with some type of human readable or machine readable identification indicia, such as the label affixed to the spine of each binder. In more sophisticated systems, a computer is used to assist in keeping track of the binders. When a binder is removed from the usual location, some procedure is typically available to note the fact that that binder has been removed from its normal location. This procedure normally relies on either manual entry of the change into the system computer by an operator, or the use of label reading devices (e.g., bar code readers) to enter the information into the system computer. Unfortunately, not all users follow the binder tracking procedure faithfully and the result is that many binders can be missing from their assigned shelf positions at any given time.

A further disadvantage with known binder management systems lies in the fact that it is unnecessarily time-consuming to visually locate a sought binder even if that binder is in its proper location. The user must visually scan the spine label of each binder on a given shelf in a given cabinet until the sought binder is visually identified by the label information. If the sought binder has been previously misplaced on the wrong shelf of the same cabinet, the user must then visually scan all binders on the other shelves of that same cabinet until the sought binder is visually identified. If, after visually scanning all binders on all shelves of the same cabinet, the sought binder has not been found the user has no other recourse than to continue the visual scanning process on binders on shelves in the other cabinets in the binder storage area until the sought binder is located or all binders on all shelves of all cabinets in the binder storage area have been visually scanned and the sought binder has still not been located.

SUMMARY OF THE INVENTION

The invention comprises a searchable binder suitable for use in a binder management system which is devoid of the above-noted disadvantages and which enables quick and efficient location of binders in a document management system.

From an apparatus standpoint, the invention comprises a searchable binder for use in a binder management system, the binder comprising:

a binder body having a front cover, a rear cover and a spine joining said front cover and said rear cover;

a binder mechanism mounted in the interior of said binder body, preferably on an inner surface of the rear cover;

a visible indicator, such as an LED, mounted on the binder body in a position visible from the outside of the binder, preferably the spine;

first and second ohmic contact members carried by the binder body and having contact portions extending partially externally of the binder body for receiving a binder identification signal from a source; and a binder identification circuit mounted on the binder body and coupled to the first and second ohmic contact members and the visible indicator for activating the visible indicator when a received binder identification signal designates that binder as a sought binder.

The spine has an inner surface terminating in an upper end and a lower end; and the first ohmic contact member is preferably mounted on the inner surface of the spine adjacent the upper end and the second ohmic contact member is preferably mounted on the inner surface of the spine adjacent the tower end.

In a first embodiment, each of the first and second ohmic contact members comprises a body portion terminating in a curved outer end extending outwardly of the spine. In a second embodiment, each of the first and second ohmic contact members comprises a housing having an inner volume, a ball contact movably received in the inner volume, and a bias spring captured between the ball contact and the housing for biasing the ball contact in an outward direction.

In a first embodiment, the binder identification signal comprises a binder address unique to the associated binder; and the binder identification circuit includes an addressable decoder. In a second embodiment, the binder identification signal comprises an r.f. signal having a frequency unique to the associated binder; and the binder identification circuit includes a crystal having a resonant frequency equal to the frequency unique to the associated binder.

From a combination standpoint, the invention comprises a storage cabinet for a plurality of searchable binders, the cabinet having an upper shelf and a lower shelf, with the upper shelf having a lower surface and the lower shelf having an upper surface;

a first ohmically conductive member mounted on the lower surface of the upper shelf;

a second ohmically conductive member mounted on the upper surface of the lower shelf, the first and second ohmically conductive members being adapted to receive binder identification signals from a source; and a searchable binder adapted to be removably received on the lower shelf, the binder comprising a binder body having a front cover, a rear cover, and a spine joining the front cover and the rear cover; a binder mechanism mounted in the interior of the binder body, preferably on an inner surface of the rear cover; a visible indicator such as an LED mounted on the binder body in a position visible from the outside of the binder when the binder is installed on the lower shelf, preferably on the spine; first and second ohmic contact members carried by the binder body and having contact portions extending partially externally of the binder body for ohmic engagement with the first and second ohmically conductive members when the binder is installed on the lower shelf so that a binder identification signal present on at least one of the first and second ohmically conductive members is transferred to the first and second ohmic contact members; and a binder identification circuit mounted on the binder body and coupled to the first and second ohmic contact members and the visible indicator for activating the visible indicator when a received binder identification signal designates that binder as a sought binder.

The spine has an inner surface terminating in an upper end and a lower end; and the first ohmic contact member is mounted on the inner surface of the spine adjacent the upper end and the second ohmic contact member is mounted on the inner surface of the spine adjacent the tower end.

In a first embodiment each of the first and second ohmic contact members comprises a body portion terminating in a curved outer end extending outwardly of the spine. In a second embodiment, each of the first and second ohmic contact members comprises a housing having an inner volume, a ball contact movably received in the inner volume, and a bias spring captured between the ball contact and the housing for biasing the ball contact in an outward direction.

In a first embodiment, the binder identification signal comprises a binder address unique to the associated binder, and the binder identification circuit includes an addressable decoder. In a second embodiment, the binder identification signal comprises an r.f. signal having a frequency unique to the associated binder, and the binder identification circuit includes a crystal having a resonant frequency equal to the frequency unique to the associated binder.

The combination may further include a visible indicator mounted on at least one of the upper and lower shelves for visually indicating the presence of a sought binder on one of the shelves.

Similarly, the combination may further include an audible indicator mounted on at least one of the upper and lower shelves for audibly indicating the presence of a sought binder on one of the shelves.

When a binder is being sought, an operator may enter the appropriate binder information into a host computer, which can perform a table look-up for the binder identification information-i.e. address or crystal frequency, and transmit this information to all binder cabinets. When a binder identification signal is matched to a binder by the binder identification circuit, the visible indicator on the corresponding binder is activated and the user can visually identify the binder being sought. In addition, for large or brightly lit binder storage areas the shelf visible indicators and the optional shelf audible indicators assist the user in locating the sought binder.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
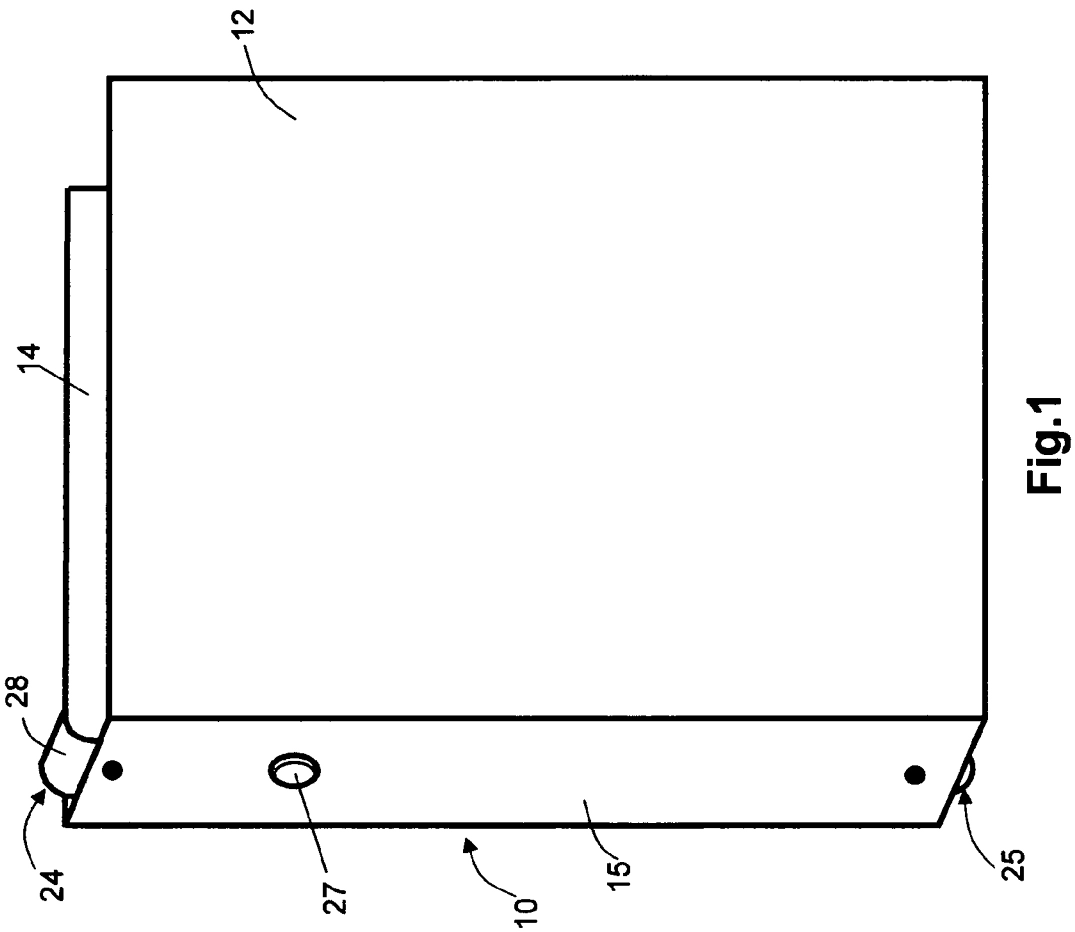
FIG. 1 is a perspective view of a binder according to the invention.
Figure 2:
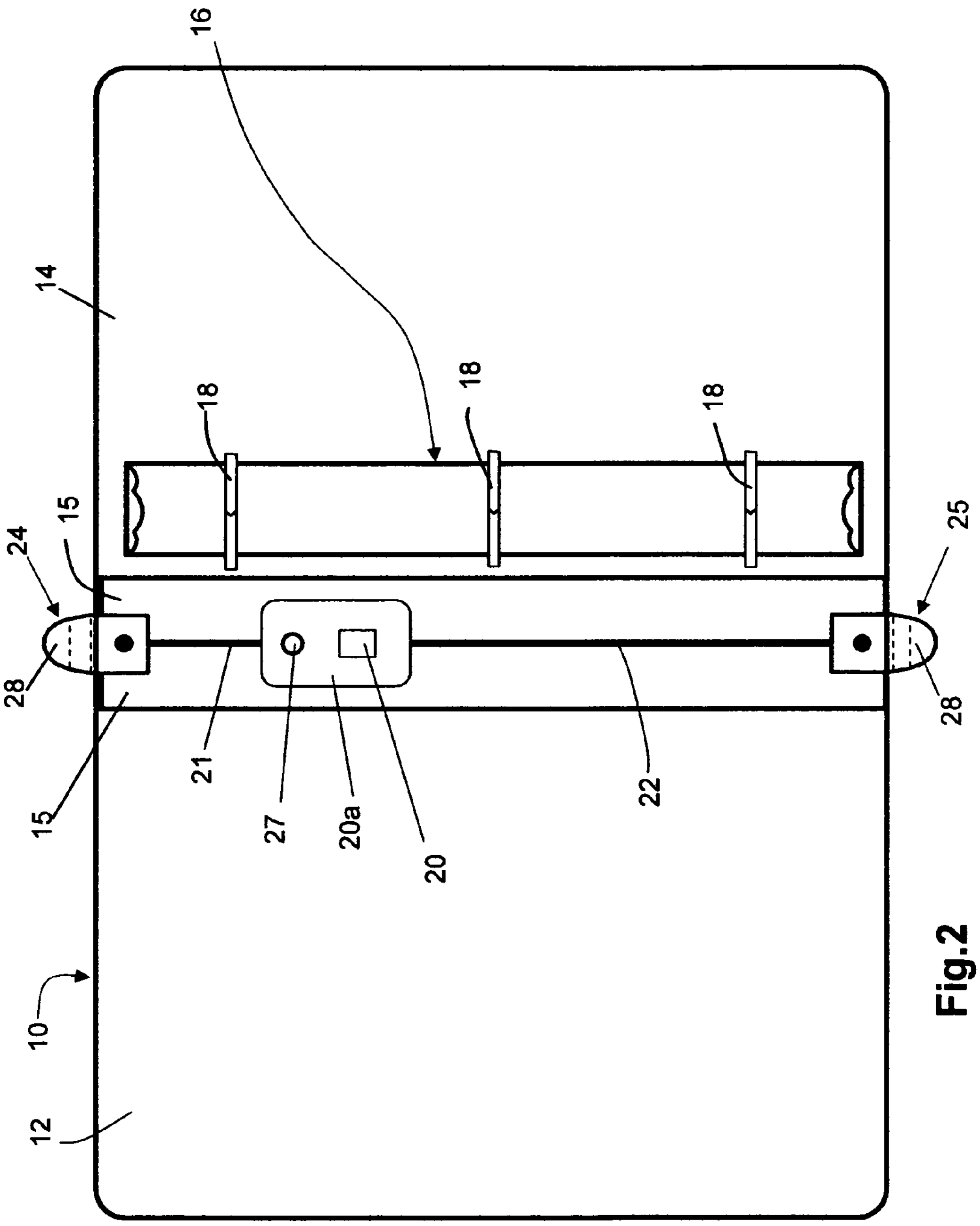
FIG. 2 is a plan view of the binder of FIG. 1 in the opened position.

Turning now to the drawings, FIGS. 1 and 2 illustrate a single binder according to the invention. As seen in these Figs., a binder 10 has a front cover 12, a back cover 14 and a spine 15 joining the front and back covers 12, 14. A conventional multi-ring manually operable binder mechanism 16 having a plurality (3 illustrated) of two-piece arcuate rings 18 is permanently mounted to the inner face of rear cover 14 to facilitate insertion, storage and removal of documents having a number of holes formed along a mounting edge, with the number of holes corresponding to the number of rings 18 of the binder mechanism 16. Mounted on the inner surface of spine 15 are a binder identification circuit 20 (described more fully below) carried by a substrate 20*a*, a pair of ohmic conductors 21, 22, an upper ohmic contact 24, a lower ohmic contact 25, and a visible indicator 27, preferably an LED. Visible indicator 27 is mounted in an opening formed in spine 15 so as to be visible from the outer side of binder 10. Upper and lower ohmic contacts 24, 25 are arranged on spine 15 in a position extending slightly above and below the upper and lower margins of spine 15 as shown. In the embodiment shown in FIGS. 1 and 2, each ohmic contact 24, 25 is a spring contact having a curved engagement portion 28 to promote sliding engagement with conductive strips described below which are carried by binder support shelves. This arrangement enables the upper and lower ohmic contacts 23, 25 to ohmically engage conductive strips mounted on the shelves described below on which the binder can be removably stored.

Figure 3:
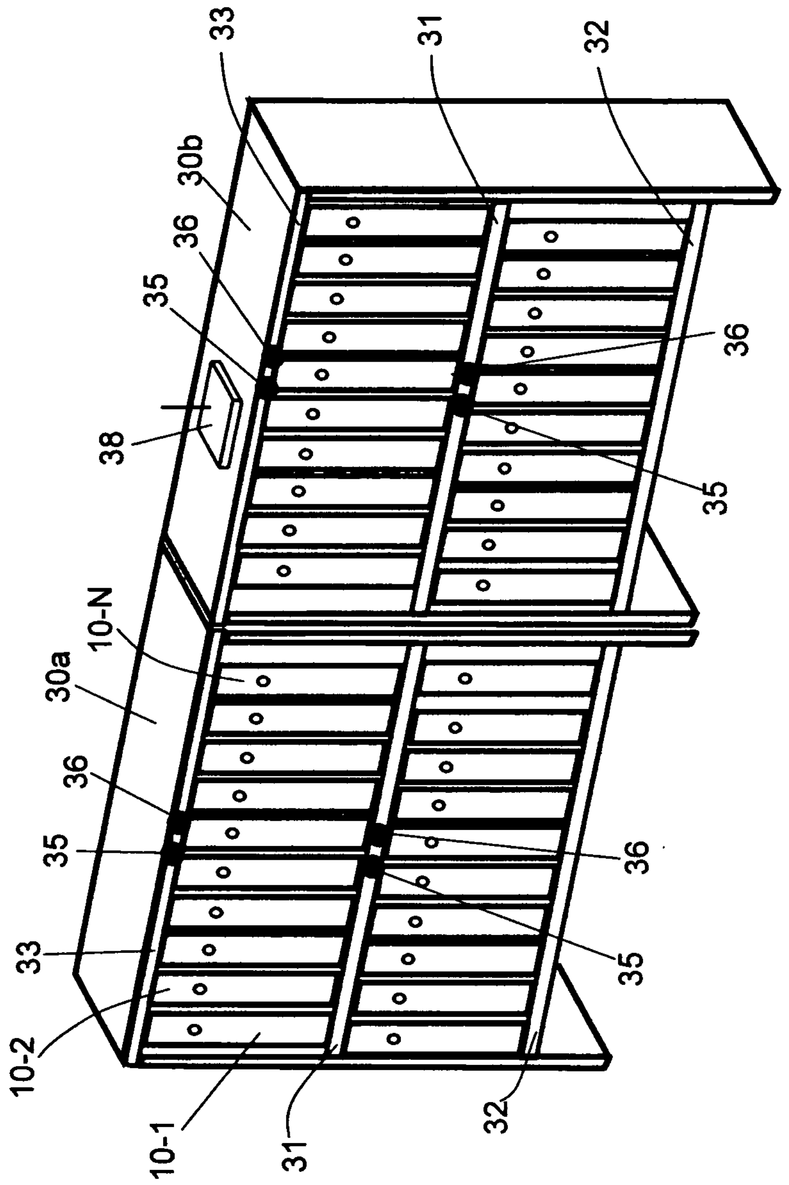
FIG. 3 is a perspective view of a pair of multiple-shelf binder storage cabinets.

FIG. 3 is a perspective view of a pair of multiple-shelf storage cabinets designed for use with the binder 10 of FIGS. 1 and 2. As seen in this Fig., each storage cabinet 30*a*, 30*b* has a plurality (2 illustrated) of storage shelves 31, 32 and a top shelf 33. A plurality of binders 10-1, 10-2, 10-N are removably received on a given shelf 31, 32. Each shelf 31, 32 has an associated visible indicator 35, preferably an LED; and an optional audible indicator 36, such as a type AT-1220-TT-R available from PUI Audio, Inc. of Dayton, Ohio, for a purpose to be described. Mounted on an appropriate portion of the pair of storage cabinets 30*a*, 30*b* is a unit 38 containing a local microcomputer and a conventional wireless transponder (Wifi unit) capable of sending and receiving information to and from a host computer.

Figure 4:
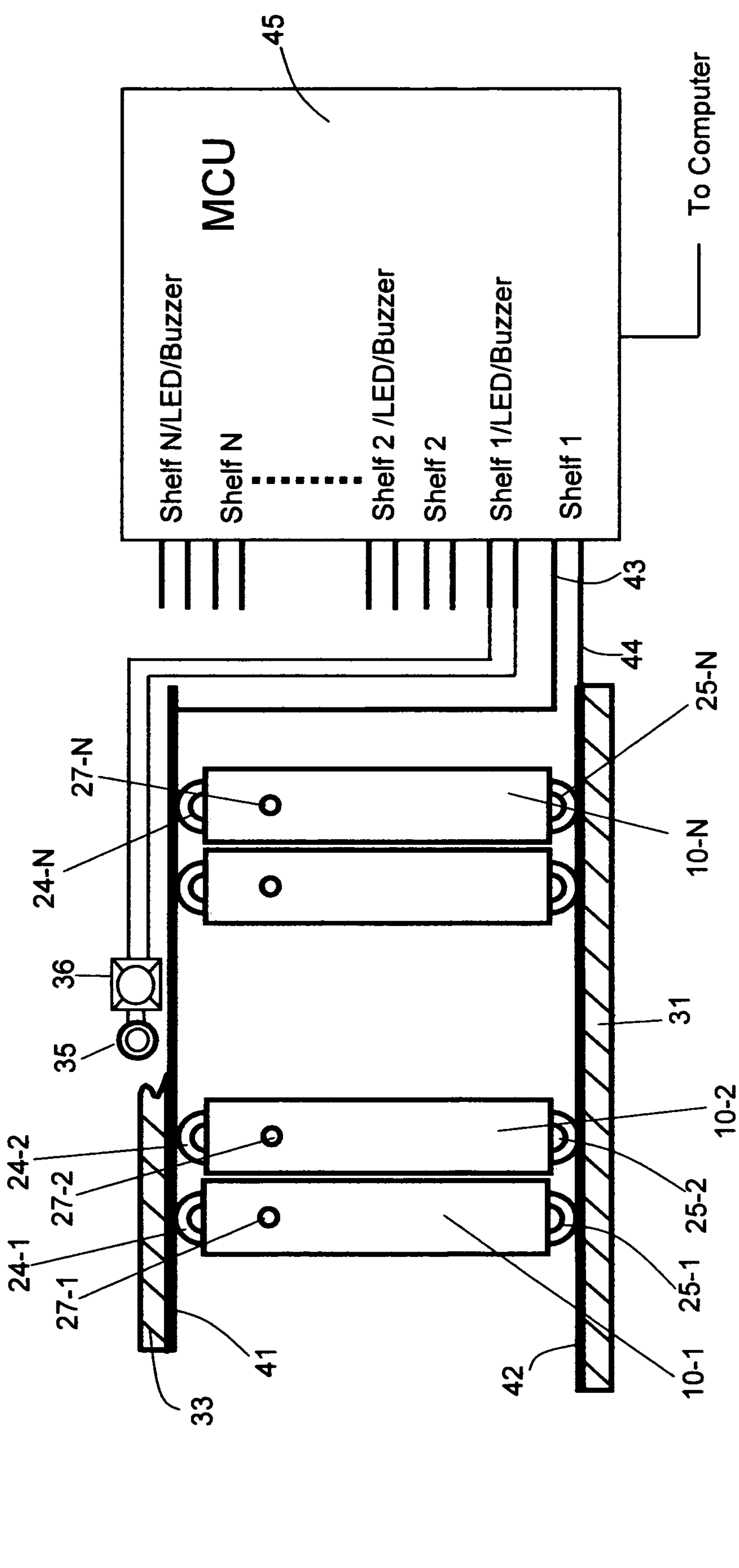
FIG. 4 is an enlarged partial front schematic view of a portion of a binder storage cabinet illustrating a removable contact arrangement and electrical components.

FIG. 4 is an enlarged partial front schematic view of that portion of binder storage cabinet 30*b* including top shelf 33 and middle shelf 31 and illustrating a removable contact arrangement and associated electrical components. As seen in this Fig., a first laterally extending ohmically conductive strip 41 is mounted to the undersurface of top shelf 33, and a second laterally extending ohmically conductive strip 42 is mounted to the top surface of underlying shelf 31. The position of each conductive strip 41, 42 is chosen such that the upper and lower contacts 24-*i* and 25-*i* of binders 10-*i* will engage the conductive strips 41, 42 so as to make ohmic contact therewith whenever a binder 10-*i* is installed on underlying shelf 31. Essentially similar ohmically conductive strips are mounted to the undersurface of shelf 31 and the top surface of shelf 32 to provide this same conductive capability. A local cabinet microcomputer (MCU) 45, such as a type AT89C2051 device available from Intel Corporation of Santa Clara, Calif. or a type LPC 1766 available from NXP Semiconductors of Eindhoven, The Netherlands, has a data output terminal 43 coupled to upper conductive strip 41 and an input terminal 44 coupled to lower conductive strip 42. As denoted by the lead lines and legends of FIG. 4, other input and output paired terminals are coupled to the conductive strips 41, 42 of the other shelf combinations. MCU 45 also has other paired input/output terminals labeled "Shelf 1/LED/Buzzer, Shelf 2/LED/Buzzer, . . . , Shelf N/LED/Buzzer" in FIG. 4 which are coupled to the visible indicators 35 and optional audible indicators 36 of each shelf pair. MCU 45 is also coupled by means of the wireless transponder noted above to a host computer as denoted by the legend "To Computer". As will now be apparent, when a binder 10-*i* having ohmic spring contacts 24-*i*, 25-*i* is installed on a shelf, these ohmic spring contacts 24-*i*, 25-*i* will engage the corresponding one of conductive strips 41, 42.

Figure 5:
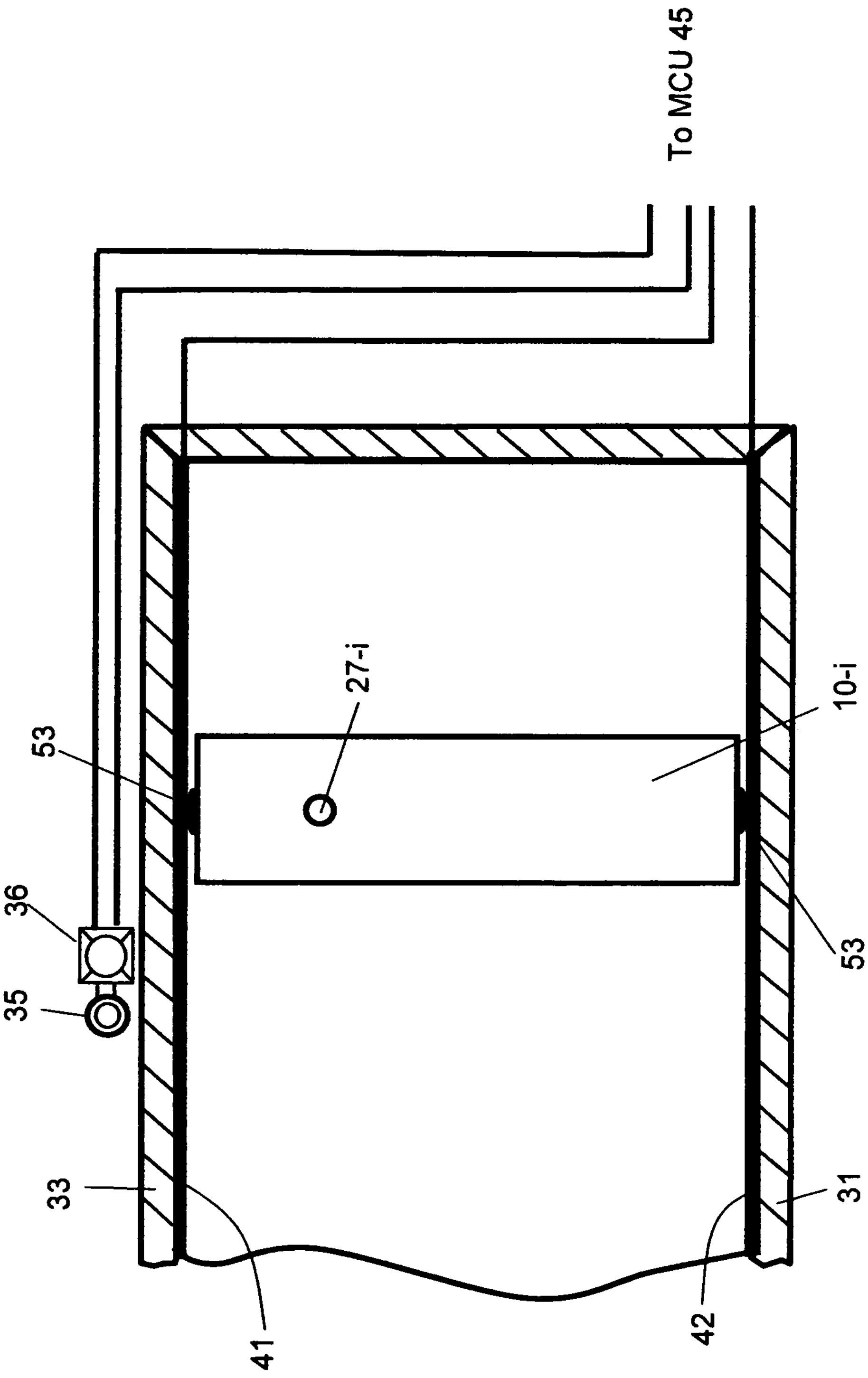
FIG. 5 is an enlarged partial front view of a portion of a cabinet shelf illustrating another removable contact arrangement.
Figure 6:
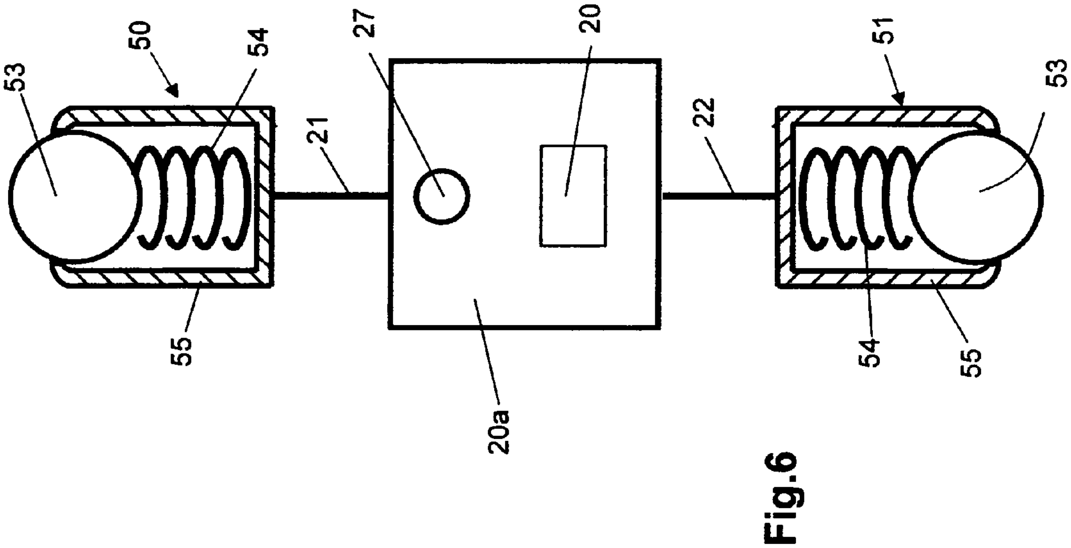
FIG. 6 is a schematic view further illustrating the contact arrangement of FIG. 5.

FIGS. 5 and 6 illustrate an alternate form of ohmic contact for binders 10-*i*. For conciseness, MCU 45 is not illustrated in these Figs. As seen in these Figs., spring contacts 24, 25 are replaced by captured ball and spring units 50, 51 mounted in a binder 10 adjacent the upper and lower margins thereof. Each ball and spring unit includes an ohmically conductive ball 53 and a compression spring 54 captured in a housing 55. The ball 53 in the upper spring unit 50 is ohmically connected to one terminal of binder identification circuit 20 via conductor 21, while the ball 53 in the lower spring unit 50 is ohmically connected to the other terminal of binder identification circuit 20 via conductor 22. The ohmic connections between ball 53 and conductors 21, 22 may be made via housing 55 or spring 54 or both. In use, when a binder 10 is installed on a cabinet shelf, the conductive strips 41, 42 engage the balls 53, slightly compressing the springs 55, and ensuring effective ohmic contact.

Figure 7:
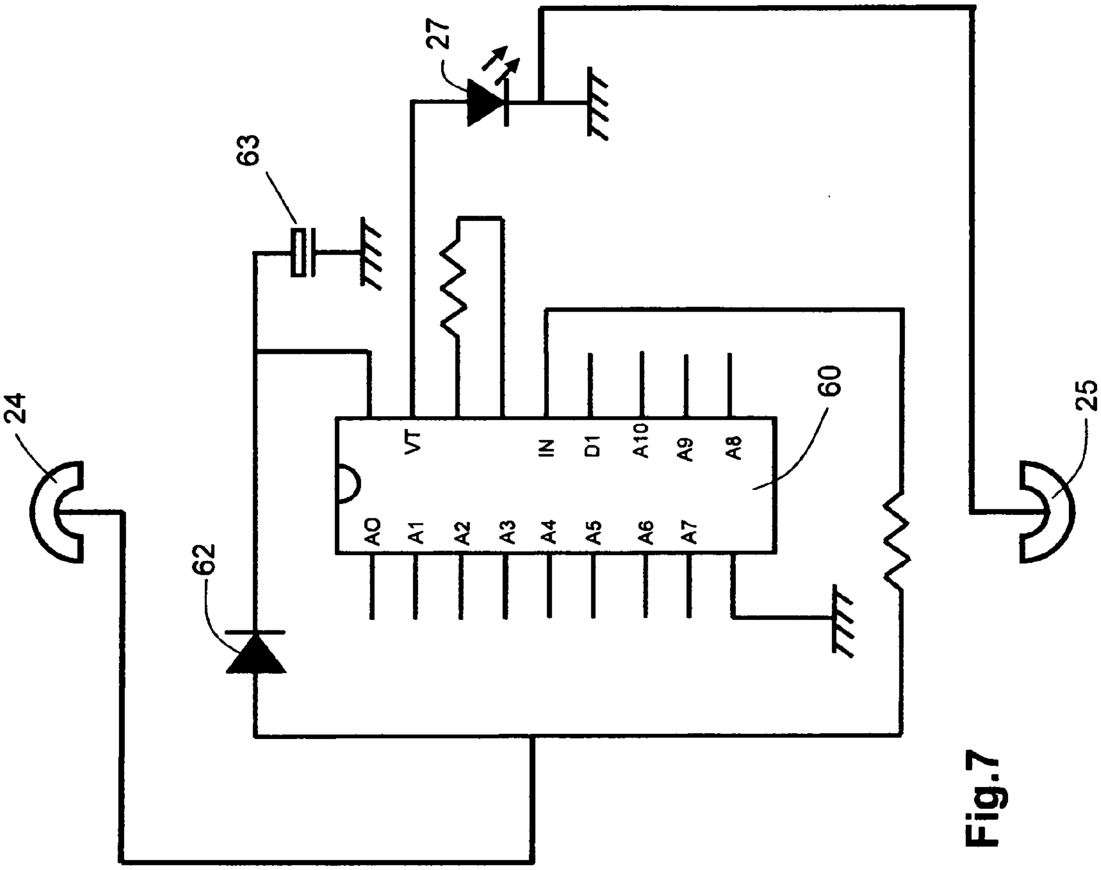
FIG. 7 is a schematic view of a first binder identification circuit using an addressable decoder.

FIG. 7 is a schematic view of a first binder identification circuit using an addressable decoder circuit. As seen in this. Fig., upper contact 24 is ohmically connected to an address input IN of an address decoder chip 60 which has a unique address hard wired therein by means of address input terminals A0-A7. Address decoder chip 60 is preferably a type PT2272 address decoder available from Princeton Technology Corp. of Taipei, Taiwan. Upper contact 24 is also coupled via a diode 62 to a storage capacitor 63 to provide D.C. power to chip 60 whenever there is an incoming address signal from MCU 45. As shown in FIG. 4, contact 24 is also coupled to an output terminal of MCU 45. When MCU 45 supplies a multi-bit address to contact 24, this information is serially coupled to the IN input of address decoder chip 60 and compared with the address hard-wired into decoder chip 60. If the incoming address matches the hard-wired address, decoder chip 60 outputs a signal on terminal VT which activates LED 27. The activation of visible indicator 27 causes D.C. current to flow through indicator 27 and back to MCU 45 via contact 25 and the return path shown in FIG. 4. This current flow is sensed by MCU 45, which then activates the shelf LED 35 and optional audible indicator 36 for the shelf on which the binder 10-*i* having the matched address decoder chip 60 is located. MCU 45 also transmits a "Found" signal to the host computer when an address match has been detected.

Figure 8:
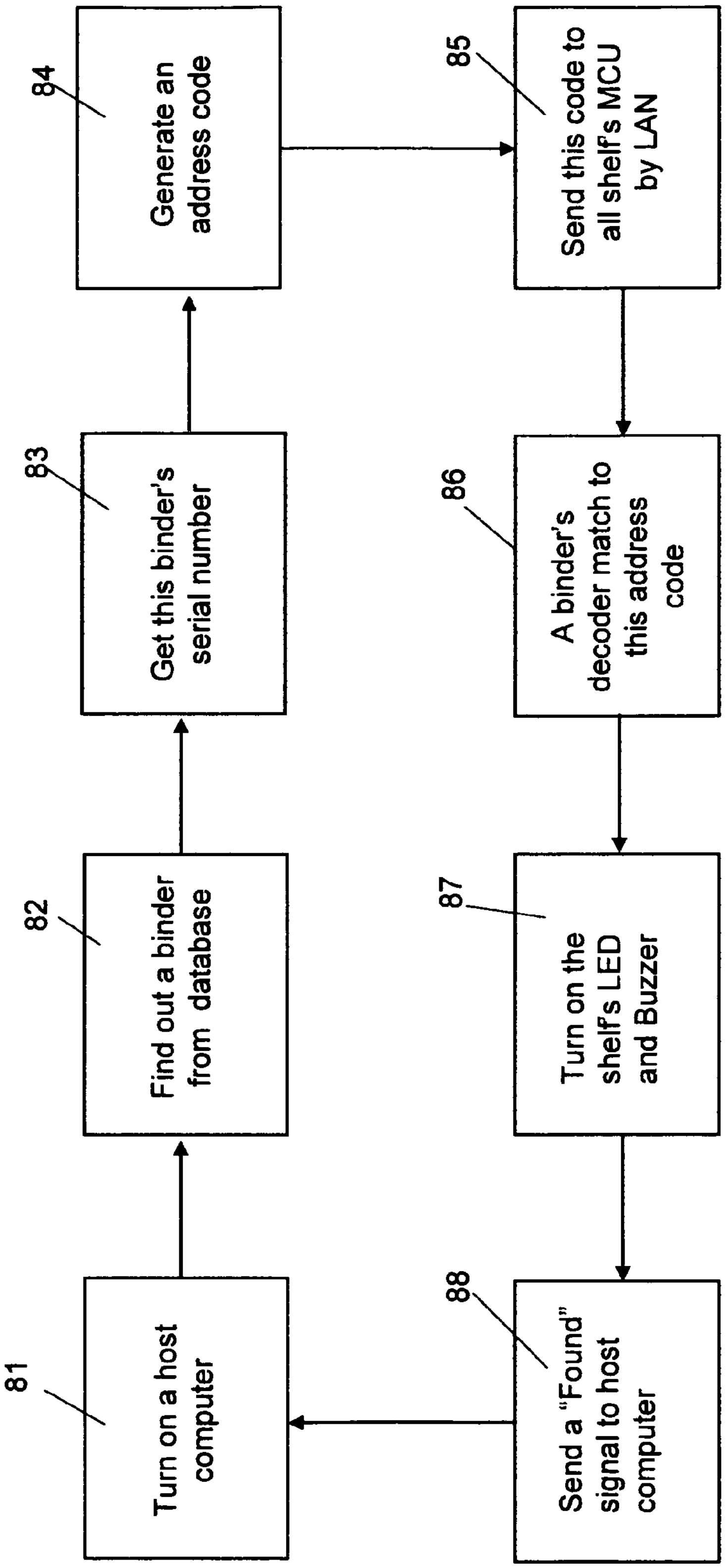
FIG. 8 is block diagram illustrating the binder location technique used in conjunction with the first binder identification circuit.

FIG. 8 is block diagram illustrating the binder location technique used in conjunction with the first binder identification circuit of FIG. 7. As seen in this Fig., the process begins with an operator turning on the host computer in flow block

81. Thereafter, in block 82 the operator enters the system identification of a binder or a document stored in a binder. Next, the host computer searches the system database for the serial number of the specified binder or the serial number of the binder containing the specified document (block 83). Once the binder serial number has been located, the host computer generates the corresponding address code of the binder to be found (block 84). This code matches the code hard-wired into the decoder chip 60 contained in the binder to be found. This address code is then broadcast to all MCUs 45 in the system (block 85). Each MCU 45 then outputs the received address code to the code conductor 41 for each shelf and awaits a positive response from one of the decoder chips (block 86). If an MCU 45 senses a positive response (current flowing through one of the visible indicators 27), MCU 45 then activates the corresponding shelf LED 35 and optional buzzer 36 (block 87) and generates a "Found" signal which is then transmitted to the host computer by the Wifi unit in unit 38 (block 88). The operator can then look around the binder storage area for the shelf with the activated shelf LED 35, proceed to that shelf and look for the binder with the activated LED 27. If the optional audible indicator 36 is provided (typically for a relatively large binder storage area or a brightly lit area), the operator may proceed in the direction of the audible sound until the illuminated shelf LED 35 is visually located.

The integrity of the entire collection of binders 10-*i* can be quickly checked by operating the host computer in the sweep address mode. As the addresses are swept over the entire range of possible addresses, all binder identification circuits 20 which are operationally present in the collection of cabinets will respond by activating the corresponding binder LED 27 and this will be detected by the corresponding single board computer 45 and a "Found" signal will be transmitted back to the host computer. The address of any missing or non-functioning binder identification circuit 20 will not result in the generation of a "Found" signal, and this lack of response will be detected by the system host computer. This absence of an operational binder identification circuit 20 of a given specific address can be correlated by the system host computer to the binder identification in the system host computer by noting the addresses of the non-responsive binder identification circuits.

Figure 9:
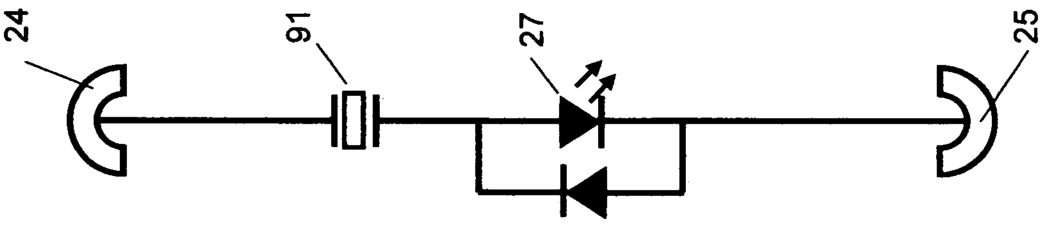
FIG. 9 is a schematic view of a second binder identification circuit using a crystal resonant at a unique frequency.

FIG. 9 is a schematic view of a second binder identification circuit using a single unique frequency crystal. As seen in this Fig., upper contact 24 is ohmically connected to a first terminal of a crystal 91 having a resonant frequency. The other terminal of crystal 91 is coupled to the anode terminal of LED 27. The cathode of LED 27 is coupled to lower contact 25. When an r.f. signal having a frequency of the crystal is applied across the two crystal terminals, the crystal will resonate and current will flow through the LED 27 thereby illuminating same. The crystal 91 in each binder identification circuit has a resonant frequency which is unique and different from the crystal 91 in all the other binder identification circuits in the system, and the host computer contains a master list of crystal frequencies correlated by serial number to the individual binders 10-*i*.

Figure 10:
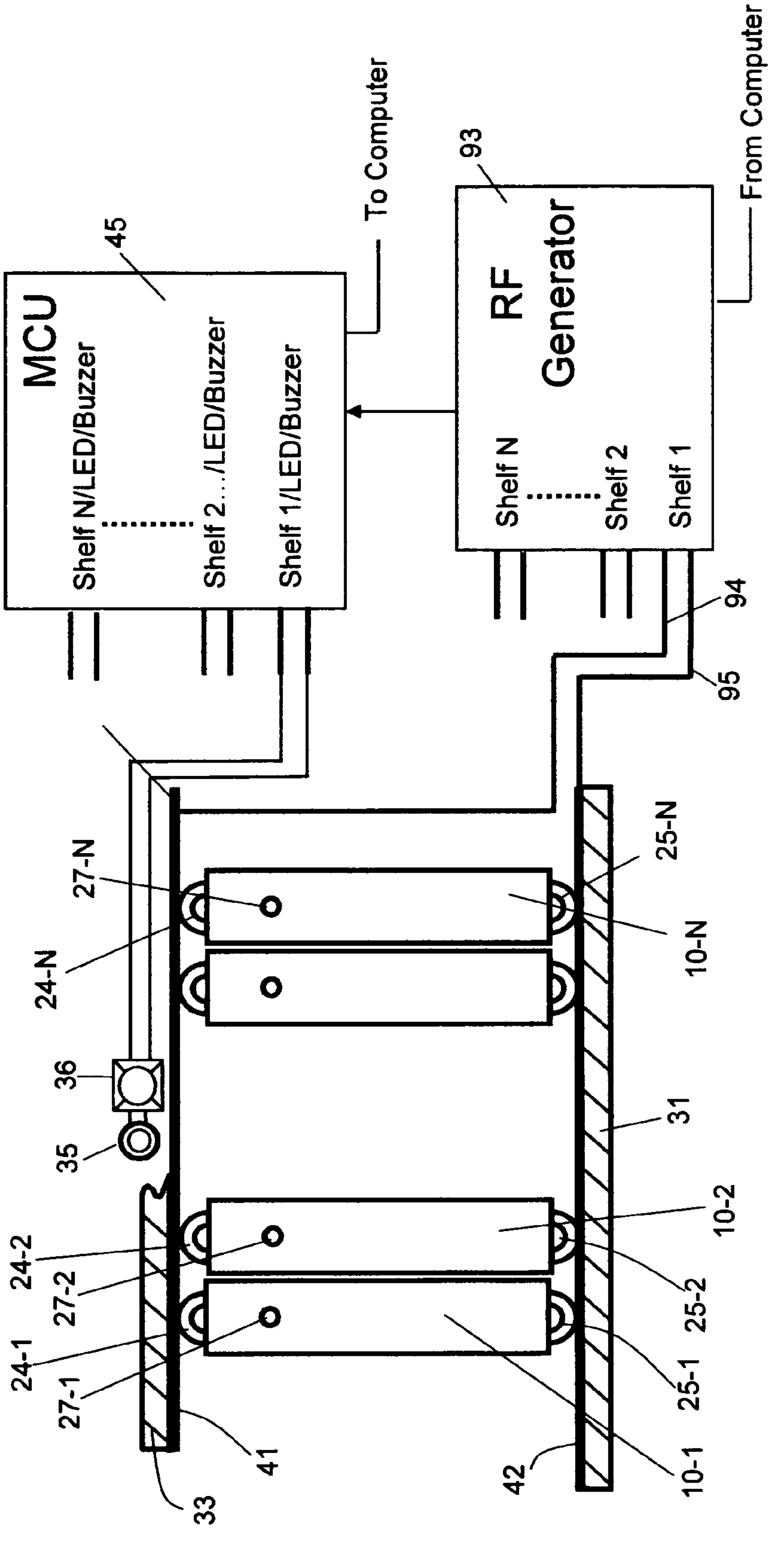
FIG. 10 is a view similar to FIG. 4 illustrating the local electrical components used with the second binder identification circuit.

FIG. 10 is an enlarged partial front schematic view of a portion of a binder storage cabinet illustrating a removable contact arrangement and the electrical components employed with the crystal circuit of FIG. 9. As seen in this Fig., the ohmic conductive strips 41, 42, shelf visible indicator 35, and optional shelf audible indicator 36 are essentially arranged in the same physical manner as the arrangement of FIG. 4 described above. However, MCU 45 does not supply data to conductive strip 41 in the FIG. 10 embodiment. Instead, an R.F. generator 93 is provided which has a pair of r.f. signal terminals 94, 95 coupled to upper conductive strip 41 and lower conductive strip 42 of each shelf pair in a given cabinet. R.F. generator 93 is a conventional device capable of generating single frequency r.f. signals over a predetermined range of permitted frequencies, e.g 2-20 mHz, in response to receipt of a desired frequency instruction signal from the host computer. MCU 45 does control the operation of the shelf visible indicators 35 and optional shelf audible indicators 36 in response to the receipt of a signal from R.F. generator 93 indicating that the crystal having the desired frequency is resonating in one of the binder identification circuits on a given shelf.

Figure 11:
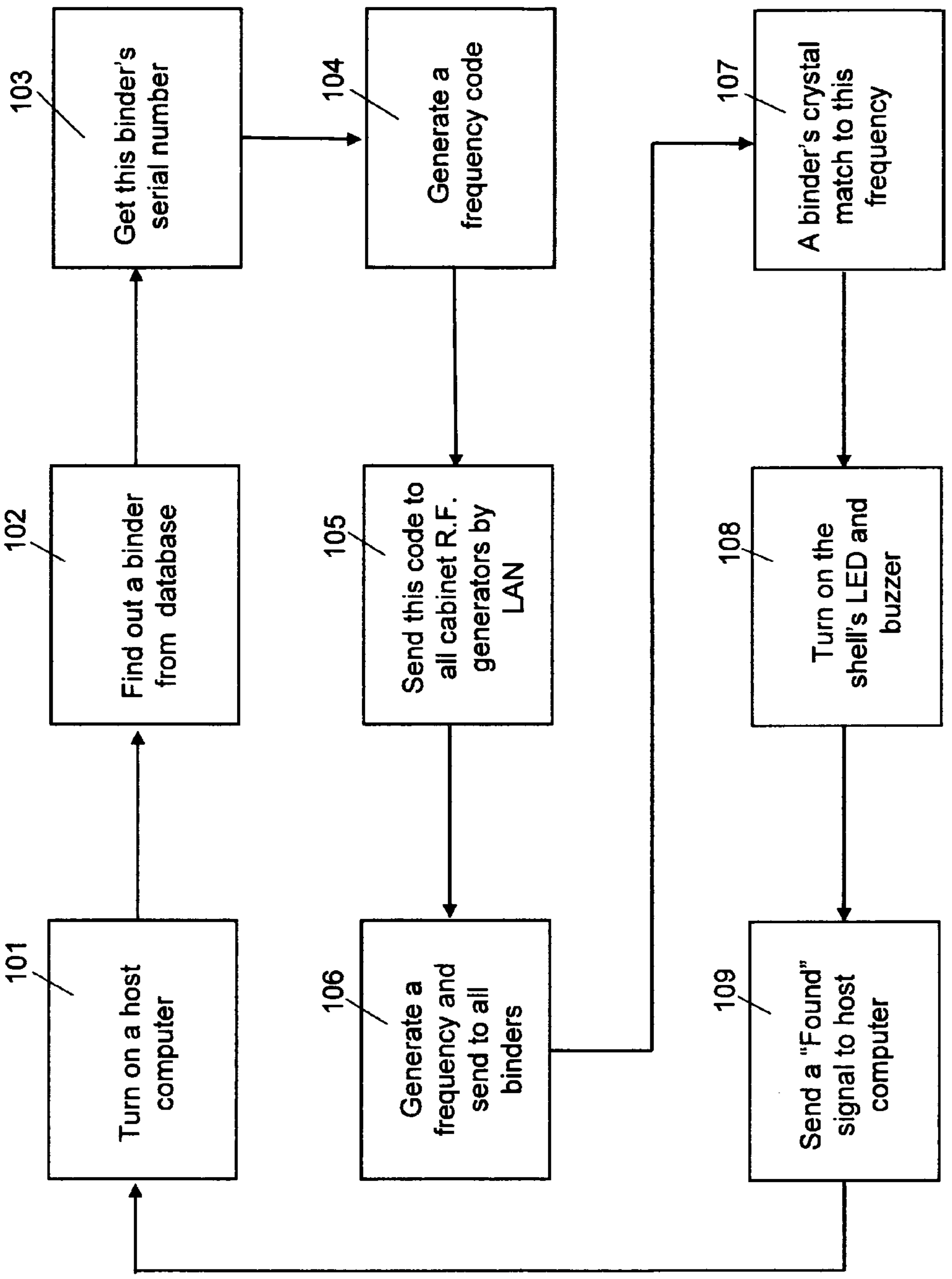
FIG. 11 is a block diagram illustrating the binder location technique used in conjunction with the second binder identification circuit.

FIG. 11 is block diagram illustrating the binder location technique used in conjunction with the second binder identification circuit of FIG. 9. As seen in this Fig., the process begins with an operator turning on the host computer in flow block 101. Thereafter, in block 102 the operator enters the system identification of a binder or a document stored in a binder. Next, the host computer searches the system database for the serial number of the specified binder or the serial number of the binder containing the specified document (block 103). These steps are essentially the same as steps 81-83 in FIG. 8. Once the binder serial number has been located, the host computer generates the corresponding frequency code of the binder to be found (block 104). This frequency matches the frequency of the crystal in the binder identification circuit contained in the binder to be found. This frequency code is then broadcast to all R.F. generators 93 in the system (block 105). Each R.F. generator 93 then generates an r.f. signal of the desired frequency for all of the shelf pairs in the associated cabinet (block 106). If the binder identification circuit having the crystal of the specified frequency is located on one of the shelves in the cabinet, the crystal will resonate and the corresponding LED 27 will turn on (block 107). This condition is sensed by the R.F. generator 93 in the cabinet containing the binder identification circuit with the resonating crystal, and the condition is reported by the R.F. generator 93 to the MCU 45. In response, the MCU 45 activates the visible shelf indicator 35 and optional audible shelf indicator 36 for the shelf containing the sought binder 10-*i* (block 108), and generates a "Found" signal which is then transmitted to the host computer by the Wifi device in unit 38 (block 109). The operator can then look around the binder storage area for the shelf with the activated shelf LED 35, proceed to that shelf and look for the binder with the activated LED 27. If the optional audible indicator 36 is provided (typically for a relatively large binder storage area or a brightly lit area), the operator may proceed in the direction of the audible sound until the illuminated shelf LED 35 is visually located.

The R.F. signal generator 93 in each cabinet may comprise a sweep frequency generator capable of generating R.F. signals in a swept mode, beginning with the first crystal resonant frequency in the binder management system, and ending with the last crystal resonant frequency in the system. With such a signal generator, the integrity of the entire collection of binders can be quickly checked by instructing the R.F. signal generator 93 to operate in the sweep mode. As the signal frequencies are swept over the entire range, all binder identification circuits which are present in a given cabinet will resonate at their respective frequencies and this can be detected by the microcomputer unit 45 in each cabinet using a conventional R.F. detector circuit. Any missing binder will not respond, and this also can be detected by the microcomputer unit 45 in each cabinet using the same circuit. Any binder detected as missing can be reported by a given microcomputer unit 45 in each cabinet to the system host computer and correlated by the system host computer to the binder identification in the computer by noting the frequencies of the non-responsive binder identification circuits.

The system may be initially configured for the binders in several different ways. The most fundamental way is to place a single binder 10 onto a shelf in a cabinet, cause the cabinet R.F. signal generator 93 to sweep the range of permitted frequencies, note the frequency at which the crystal in that binder resonates, enter that frequency number into a list in the microcomputer unit 45 memory, remove the binder, insert another binder 10, and repeat this process for all binders desired on a serial basis. Once all binders have been processed, appropriate binder identification information is transmitted from microcomputer unit 45 of a given cabinet to the system host computer. This method works well for a new system with no existing binders and a relatively small number of binders required initially. A more useful technique is to insert a first binder onto a shelf, sweep the permitted R.F. frequencies, note the resonant frequency of the crystal in that binder, enter that number into a new list; insert a second binder onto the shelf without removing the first, sweep the frequencies, add the resonant frequency of crystal in the new binder to the list; insert a third binder onto the shelf, sweep the frequencies, add the resonant frequency of the crystal in the third binder to the list; etc. As each new binder is inserted onto the shelf, the microcomputer unit 45 has a running list of frequencies already identified and, since each crystal frequency is unique, there can be no duplications.

The system using addressable decoder circuits described above may be initially configured in a similar manner to that discussed above in connection with the R.F. binder identification circuit using single crystals of unique frequencies. The essential difference is that, instead of employing a swept frequency technique, a swept address technique is employed. For this technique, the host computer sequentially generates the entire set of permissible addresses in the system, notes the response from each MCU 45 in the system, and correlates this with the binder identification information.

The binder management system described above affords several advantages over known binder management systems. Firstly, a given binder can be quickly located in a binder storage area without the need to visually inspect all binder labels until the sought binder is located. Also, the integrity of the binder management system can be thoroughly tested remotely to find misfiled binders and to identify binders missing from the system.

Although the above provides a full and complete disclosure of the preferred embodiments of the invention, various modifications, alternate constructions and equivalents will occur to those skilled in the art. For example, white the invention has been described with reference to specific R.F. frequencies, other frequencies may be employed, depending on the preferences of the system designer. In addition, while the conductive strips 41, 42 have been shown as laterally disposed along the shelves, each strip may be configured as a plurality of interconnected strip portions extending inwardly of the associated shelf surface and laterally spaced by a predetermined amount. In such a variation, contacts 24, 25 may have a groove formed therein to provide positive engagement with the conductive strip portions in order to afford more mechanical stability for the binders and predetermined lateral spacing for the binders. In addition, while binder mechanism 16 has been described and illustrated as being mounted on the inside surface of back cover 14, it may be mounted on the inside surface of the front cover 12, if desired, or on the inside surface of the spine 15. If mounted on the inside surface of spine 15 care should be taken that the usually conductive binder mechanism is electrically isolated from elements 20, 20*a*, 21, 22, 24, 25, 27, and 28. Further, the invention may be used to manage a binder management system of many cabinets positioned at different physical locations using an internal or an external computer network, if desired. Therefore, the above should not be construed as limiting the invention, which is defined by the appended claims.

What is claimed is:

1. In combination:

a storage cabinet for a plurality of searchable binders, said cabinet having an upper shelf and a lower shelf, said upper shelf having a lower surface, said lower shelf having an upper surface;

a first ohmically conductive member mounted on said lower surface of said upper shelf;

a second ohmically conductive member mounted on said upper surface of said lower shelf, said first and second ohmically conductive members being adapted to receive binder identification signals from a source; and a searchable binder adapted to be removably received on said lower shelf, said binder comprising a binder body having a front cover, a rear cover, and a spine joining said front cover and said rear cover; a binder mechanism mounted in the interior of said binder body; a visible indicator mounted on said binder body in a position visible from the outside of the binder when said binder is installed on said lower shelf; first and second ohmic contact members carried by said binder body and having contact portions extending partially externally of said binder body for ohmic engagement with said first and second ohmically conductive members when said binder is installed on said lower shelf so that a binder identification signal present on at least one of said first and second ohmically conductive members is transferred to at least one of said first and second ohmic contact members; and a binder identification circuit mounted on said binder body and coupled to said first and second ohmic contact members and said visible indicator for activating said visible indicator when a received binder identification signal designates said binder as a sought binder.

2. The combination of claim 1 wherein said visible indicator is mounted on said spine.

3. The combination of claim 1 wherein said spine has an inner surface terminating in an upper end and a lower end; and wherein first ohmic contact member is mounted on said inner surface of said spine adjacent said upper end and said second ohmic contact member is mounted on said inner surface of said spine adjacent said lower end.

4. The combination of claim 3 wherein each of said first and second ohmic contact members comprises a body portion terminating in a curved outer end extending outwardly of said spine.

5. The combination of claim 3 wherein each of said first and second ohmic contact members comprises a housing having an inner volume, a ball contact movably received in said inner volume, and a bias spring captured between said ball contact and said housing for biasing said ball contact in an outward direction.

6. The combination of claim 1 wherein said binder identification signal comprises a binder address unique to the associated binder; and wherein said binder identification circuit includes an addressable decoder.

7. The combination of claim 1 wherein said binder identification signal comprises an r.f. signal having a frequency unique to the associated binder; and wherein said binder identification circuit includes a crystal having a resonant frequency equal to the frequency unique to said associated binder.

8. The combination of claim 1 wherein said visible indicator comprises an LED.

9. The combination of claim 1 further including a visible indicator mounted on at least one of said upper and lower shelves for visually indicating the presence of a sought binder on one of said shelves.

10. The combination of claim 1 further including an audible indicator mounted on at least one of said upper and lower shelves for audibly indicating the presence of a sought binder on one of said shelves.

* * * * *